UNITED STATES PATENT OFFICE.

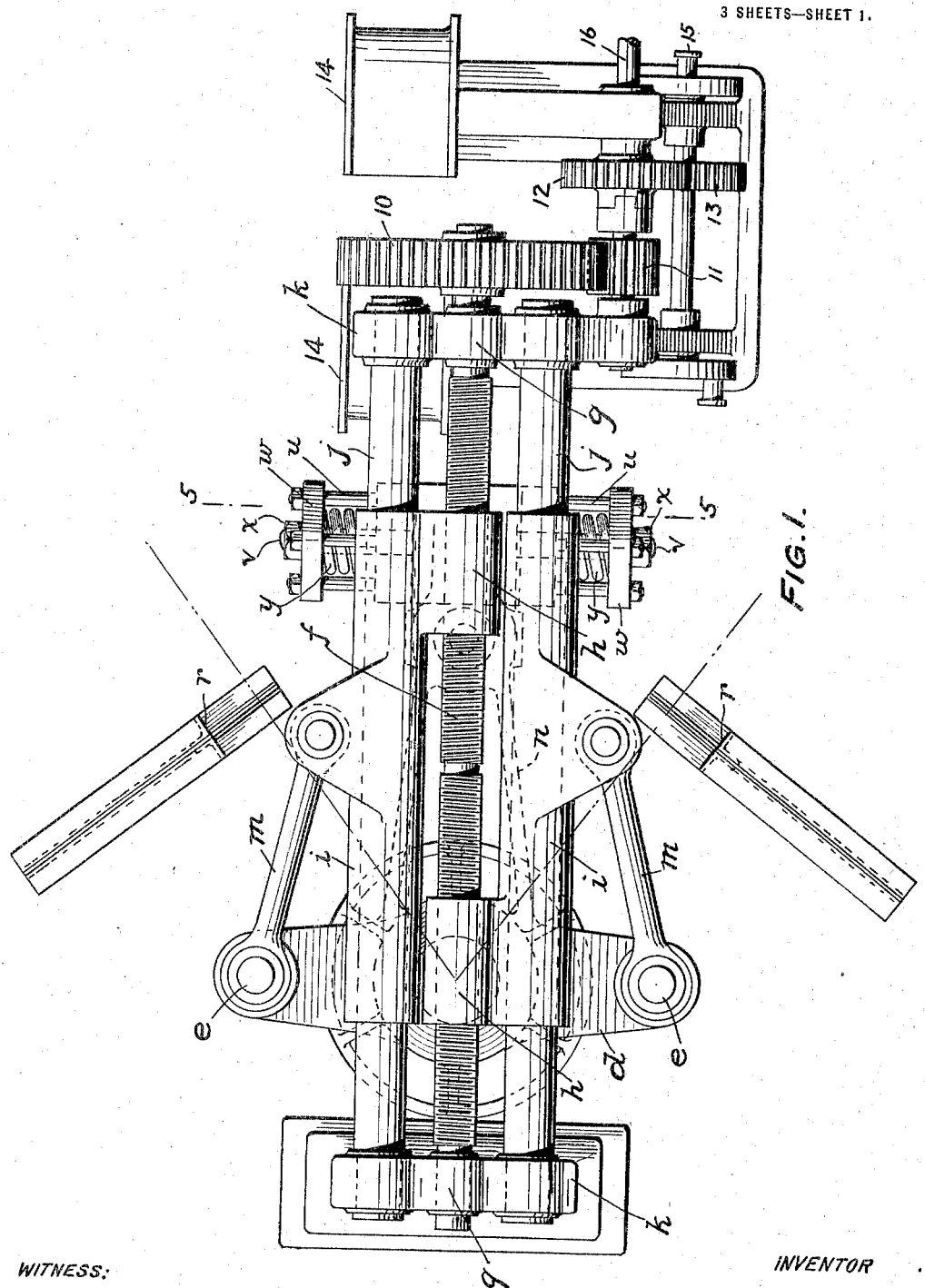

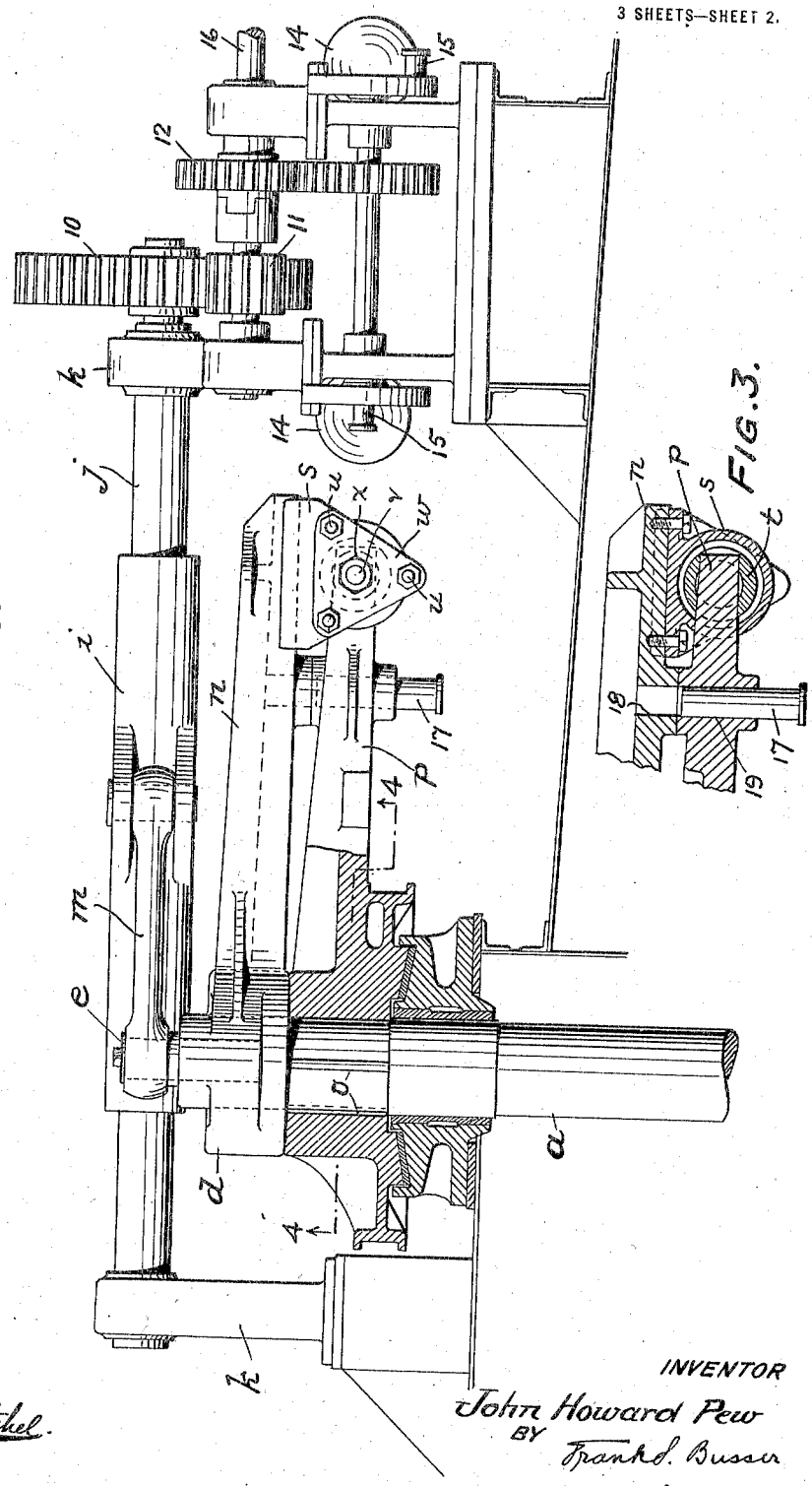

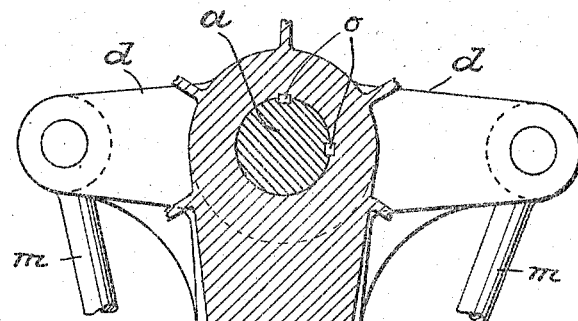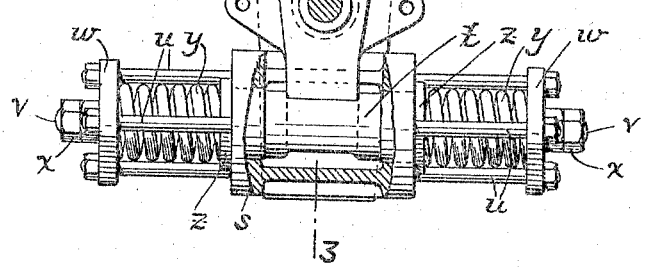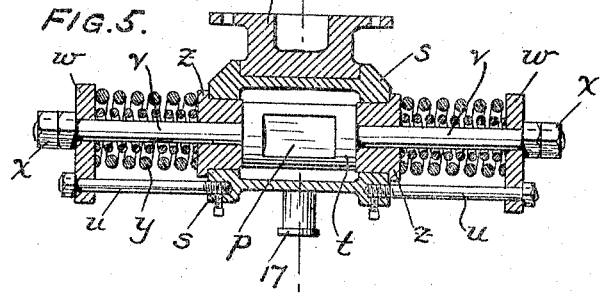

JOHN HOWARD PEW, OF ARDMORE, PENNSYLVANIA, ASSIGNOR TO SUN SHIPBUILDING COMPANY, OF CHESTER, PENNSYLVANIA, A CORPORATION OF PENNSYLVANIA.

STEERING-GEAR FOR SHIPS.

1,290,337.     Specification of Letters Patent.     Patented Jan. 7, 1919.

Application filed April 19, 1918. Serial No. 229,506.

*To all whom it may concern:*

Be it known that I, JOHN HOWARD PEW, a citizen of the United States, residing at Ardmore, county of Montgomery and State of Pennsylvania, have invented a new and useful Improvement in Steering-Gears for Ships, of which the following is a full, clear, and exact description, reference being had to the accompanying drawings, which form a part of this specification.

My invention relates to the class of steering gears for use in vessels of substantial size. These steering gears are power-driven and also operable by hand wheels, the power being applied to a lever or cross-beam at or near the top of the rudder post.

One of the disadvantages of such mechanism as at present usually constructed is its rigidity, whereby the force of the water against the rudder is transmitted directly from the steering post, through the mechanism, to the engine or hand wheels. This is productive of a series of shocks upon the mechanism. It is one of the objects of my invention to eliminate this feature.

In many respects the construction of a steering gear embodying my invention may be similar to the usual steering mechanism, but the following is one important difference: that, whereas, in the usual construction, the power is applied to a lever or cross-beam directly secured to the head of the rudder post, I apply the power to a cross-beam which is pivotally mounted on the rudder post and transmit the power, through shock-absorbing springs, to a member that is directly secured to the rudder post. These springs form a resilient link in the mechanism to absorb shocks due to the action of the waves upon the rudder. My invention, however, does not involve, broadly, the employment of shock absorbing springs between the rudder and the steering mechanism as above described, my improvement residing in the construction and arrangement whereby the shock absorbing springs are applied. This will be understood by reference to the following detailed description in connection with the accompanying drawings, in which—

Figure 1 is a plan view of a steering gear embodying my invention.

Fig. 2 is a side elevation of the same, partly in section.

Fig. 3 is a cross-section on the line 3—3 of Fig. 4.

Fig. 4 is an inverted plan view, partly broken away, of the shock-absorbing mechanism and the connections therefrom to the rudder post, on the line 4—4 of Fig. 2.

Fig. 5 is a section on the line 5—5 of Fig. 1.

$a$ represents the head of the rudder post protruding from bearing $b$ upon the deck $c$ of the ship. Pivoted upon rudder post $a$ is a cross-beam $d$ which carries the tiller pins $e, e$. A screw $f$ is centrally located above the post $a$ and extends longitudinally of the ship and turns in bearings $g, g$. Screw $f$ is oppositely threaded, between bearings, with right and left hand threads to its middle point. Nuts $h, h$ engage respectively the two oppositely threaded portions of the screw. The nuts are attached respectively to two massive sleeves $i, i$ arranged on opposite sides of, and parallel to, the screw. The sleeves are slidable longitudinally on rods $j, j$ which are supported at their ends on pedestals $k, k$, which carry the bearings $g, g$. Links $m, m$ embrace the tiller pins $e, e$ and are pivotally connected at their opposite ends to sleeves $i, i$. Integral with the cross-beam $d$ is a longitudinally extending arm $n$.

Secured to post $a$ by means of keys $o$ is an arm $p$ which extends longitudinally below the pivotally mounted arm $n$. Being fixed to the post $a$ it turns with the rudder within the limits of movement imposed by the usual rudder stops $r$ secured to the deck. Secured to the forward end of the arm $n$ is a frame $s$ within which is a yoke $t$ carried on the end of the arm $p$. The frame $s$ has laterally extending rods or studs $u$ projecting from opposite sides thereof. Rods $v$ project laterally from opposite sides of yoke $t$. Heads $w$ are slidable on the studs $u$ and rods $v$. Nuts $x$ are threaded on the ends of rods $v$ outside of the heads $w$. Confined between the yoke $t$ and each head $w$ is a pair of heavy coil springs $y$. A bearing plate $z$ is confined between the inner end of each pair of coil springs $y$ and the yoke $t$ and frame $s$.

Sudden shocks or jars upon the rudder are transmitted through the arm $p$ and are taken up by both pairs of springs $y$. That is: frame $s$, through one bearing plate $z$, compresses the corresponding pair of springs $y$ against the corresponding head $w$ (which is held fixed by abutting against the corresponding nut $x$), while the other head $w$ compresses the other pair of springs $y$ against the other bearing plate $z$ (which is held fixed by abutting against the yoke $t$).

It is not essential, but merely preferable, to use a pair of springs $y$ at each side of the ends of arms $n$ and $p$. The smaller spring of each pair may be omitted. Where therefore, in the claims I specify "springs" I do not mean to be confined to the use of double springs, but refer to springs on opposite sides of the ends of the arms.

One end of screw $f$ carries a gear 10, which is actuated by the step-down gearing 11, 12, 13, either from an engine 14 connected with the crank pins 15 on the shaft of gear 13, or from suitable hand wheels, not shown, connected with the shaft 16 of gear 12.

In operating the steering gear from the engine or hand-wheel, the screw $f$, through nuts $h$, sleeves $i$, links $m$ and tiller pins $e$, swings the frame $e$—$m$, thereby, through springs $y$, turning the arm $p$ and the rudder post $a$.

I am aware, as hereinbefore stated, that it is not new, broadly, to transmit the motion of the actuating mechanism to the rudder by means of shock absorbing springs interposed between two members one fixed to, and the other pivoted upon the rudder head, one of both of which members project laterally a considerable distance from the driving screw. This construction occupies space in a lateral direction which is not usually available. Further, in a prior construction in which the members comprise arms extending one over the other, as in the present construction, but laterally, it has been found necessary to employ four springs or sets of springs, only two of which are operable at a time. A structure embodying the present invention is more compact and occupies no substantial space in a lateral direction and yet secures the advantage of using only two springs or sets of springs which are always both operable in unison.

Provision is made for rigidly connecting arms $n$ and $p$ by inserting a pin 17 (see Fig. 3) into alining holes 18 and 19 in the two arms $n$ and $p$. In the normal operation, when the two arms are not so connected, the pin 17 is retained in the hole 19 in arm $p$ by frictional engagement therewith. Thus if breakage should occur in the compression springs or other parts of the shock-absorbing connections between the arms $n$ and $p$ the steering of the vessel may be continued uninterruptedly by pushing pin 17 up into the orifice 18 of arm $n$.

Having now fully described my invention, what I claim and desire to protect by Letters Patent is:

1. In a steering gear for ships, the combination with the rudder post, a longitudinally extending driving screw, and a member turnable on said post having an arm extending when in median position longitudinally of the screw but swingable on either side of its median position, of a second arm fixed on the rudder post and extending in the same direction as the first arm, shock-absorbing mechanism connecting said arms and adapted to absorb a shock tending to turn the rudder in either direction; said shock-absorbing mechanism comprising transversely extending coacting springs, one on one side and the other on the other side, of both arms and means carried by the arms and supporting the springs.

2. In a steering gear for ships, the combination with the rudder post, a longitudinally extending driving screw, and a member turnable on said post having an arm extending when in median position longitudinally of the screw but swingable on either side of its median position, of a second arm fixed on the rudder post and extending in the same direction as the first arm, actuating mechanism connected with the turnable member, heads on opposite sides of both said arms, means supporting said heads and permitting either head to slide inwardly toward either arm but limiting its outward movement away from either arm, and springs on opposite sides of both arms, said springs being confined between both arms and the respective heads, whereby a shock received by the rudder will be transmitted through the member fixed thereto to the springs both of which will be compressed to absorb the shock.

3. In a steering gear for ships, the combination with the rudder post, a longitudinally extending driving screw, and a member turnable on said post having an arm extending when in median position longitudinally of the screw but swingable on either side of its median position, of a second arm fixed on the rudder post and extending in the same direction as the first arm, actuating mechanism connected with the turnable member, laterally movable bearing plates arranged on opposite sides of both arms, rods extending laterally outward from both arms, heads on opposite sides of both arms and slidable on said rods, means on the rods adapted to engage said heads and move them inward and also confining the heads from outward movement, and springs one between each head and the corresponding bearing plate.

4. In a steering gear for ships, the combination with the rudder post, of two arms one turnable relative to the post and the other fixed relative thereto, actuating mechanism connected with the turnable arm, a frame secured to the end portion of the first arm, a yoke carried by the end portion of the second arm and slidable laterally relatively to said frame, headed rods projecting laterally from said frame on both sides thereof, a headed rod projecting laterally from said yoke on each side thereof, laterally slidable bearing plates adapted to be engaged by both the frame and the yoke, heads slidable on said rods and springs confined between the bearing plates and the heads.

In testimony of which invention I have hereunto set my hand, at Philadelphia, on this 18th day of April, 1918.

JOHN HOWARD PEW.

Copies of this patent may be obtained for five cents each, by addressing the "Commissioner of Patents, Washington, D. C."